US005441665A

United States Patent [19]

Massaioli

[11] Patent Number: 5,441,665

[45] Date of Patent: Aug. 15, 1995

[54] PHOTOGRAPHIC EQUIPMENT CLEANER

[75] Inventor: Daniel W. Massaioli, Blacktown, Australia

[73] Assignee: Medefield Pty Ltd, Artarmon NSW, Australia

[21] Appl. No.: 109,127

[22] Filed: Aug. 19, 1993

[30] Foreign Application Priority Data

Aug. 19, 1992 [AU] Australia ........................ PL4194

[51] Int. Cl.[6] .................... C23G 1/02; C01B 15/08

[52] U.S. Cl. .............................. 252/142; 252/79.2; 252/95; 252/186.43; 134/2; 134/3

[58] Field of Search ................ 134/2, 3, 41; 252/79.1, 252/79.2, 95, 99, 100, 101, 102, 142, 186.26, 186.28, 186.3, 186.32, 186.33, 186.43

[56] References Cited

U.S. PATENT DOCUMENTS

| | | | |
|---|---|---|---|
| 3,738,867 | 6/1973 | Franz | 134/2 |
| 3,986,970 | 10/1976 | Shiga | 252/79.3 |
| 4,021,264 | 5/1977 | Knorre et al. | 134/3 |
| 4,100,095 | 7/1978 | Hutchins et al. | 252/99 |
| 4,678,597 | 7/1987 | Kiener | 252/100 |

OTHER PUBLICATIONS

J. Pouradier; "Photographic Gelatin", reprinted from Journal Signalaufzeichnungsmaterialen 3, 209–18 (1975).

Kenneth B. Wiberg; *Oxidation in Organic Chemistry*, Part A, Academic Press, New York, 1965; pp. 210–217.

W. S. Trahanovski, *Oxidations in Organic Chemistry*, Academic Press, New York, 1978; pp. 254–263.

M. Hudlicky, *Oxidations in Organic Chemistry*, American Chemical Society, Monograph 186, ACS 1990; pp. 6–15; 266–271.

*Primary Examiner*—Paul Lieberman
*Assistant Examiner*—Lorna M. Douyon
*Attorney, Agent, or Firm*—Townsend and Townsend Khourie and Crew

[57] ABSTRACT

A method of cleaning photographic apparatus comprises contacting the apparatus with an aqueous composition containing a peroxo compound chosen from one or more of:

(a) an ionic peroxide of the formula $M_xO_2$, where M is a single charged cation and x is 2, or M is a double charged cation and x is 1, or (b) a peroxo acid of sulfur, phosphorous, carbon or boron, or a salt thereof, or (c) hydrogen peroxide, or a substance that contain hydrogen peroxide.

Preferably the composition also contains acid, and/or at least one catalyst or accelerator compound. The peroxo compound may be one or more of: an ionic peroxide chosen from an alkali metal, alkaline earth metal, or ammonium, peroxide, or a peroxo acid chosen from peroxodisulfuric acid, peroxomonosulfuric acid, peroxodicarbonic acid, peroxodiphosphonic acid, perorganic acids, or a salt thereof. A preferred peroxo compound is a persulfate salt. The invention also concerns a formulation for cleaning photographic equipment. An example of a suitable such formulation contains sodium persulfate (0–100 wt %), sulfamic acid (0–30%, pH about 0.8–5.5), and boric acid and sodium metaperiodate (together 0–10%).

7 Claims, 1 Drawing Sheet

PHOTOGRAPHIC EQUIPMENT CLEANER

BACKGROUND OF THE INVENTION

The present invention relates to cleaners for photographic equipment and for other apparatus which comes into contact with photographic emulsions, photographic developer solutions, used photographic film, and so forth. The invention is particularly useful in cleaning developer racks from photographic processing equipment, and for cleaning tanks holding developer solutions, for example. It is now common for exposed photographic film to be developed using automated or semi-automated equipment whereby the exposed film is fed through a series of racks fitted with rollers. This system is used in developing normal photographic film, as well as in developing medical X-ray film, and in specialist printing and graphic arts photography.

In general, the system of developing exposed film comprises a series of three racks fitted with rollers, each rack sitting inside a tank. The film winds between the rollers, so that it can be drawn through the various liquids in the tanks, in series. The first tank normally contains a photographic developer solution. The second tank containing a roller rack normally contains photographic fixer solution, and the last rack, known as the wash rack, is located in a water-filled tank.

The first rack, in the developer solution, accumulates residues from the photographic film which passes through the developer solution, and this rack requires special cleaning on a periodic basis. Typically the rack must be cleaned monthly or quarterly, depending on the throughput of film, for instance.

In order to clean the rack, a cleaning solution is required, and in the past, the commercial cleaning system which has most often been used involves the use of an aqueous solution of a strong oxidising agent, particularly potassium dichromate, and sulfamic acid. Potassium dichromate ($K_2Cr_2O_7$) is a strong oxidising agent, and sulfamic acid ($H_2NSO_3H$) assists in cleaning the equipment, and acidifies the mixture. Chromium salts, such as potassium dichromate, can be dangerous to users, and are also enviromentally harmful, being difficult to dispose of, and chromium salts also cause problems in waste treatment plants.

In addition, the residue to be cleaned includes silver, and the dichromate cleaning mixture keeps the silver in solution, making it difficult to recover as a useful material for recycling, or else the cleaning procedure may allow some silver to be lost in the waste that is produced.

Also, the prior art potassium dichromate cleaning system is normally used at a temperature of about 30°-40° C. The dichromate concentrate is usually sold as a powder, and when used, the operator will normally make up a 4 to 5 litre concentrated solution which is poured over the rack to be cleaned and into the tank, and then the tank topped up by the addition of further hot water. In water at room temperature the powder is normally difficult to dissolve, and as well the higher temperature accelerates the cleaning ability of the dichromate solution.

It would therefore be of benefit if a cleaning solution for developer racks and the like could be developed which avoids the use of chromate compounds, and which preferably also may perform well as a cleaner in cold water as well as in hot water.

SUMMARY OF THE INVENTION

In accordance with the present invention, there is provided a method of cleaning photographic apparatus which comprises contacting the apparatus with an aqueous solution of a peroxo-type compound chosen from:

(a) an ionic peroxide of the formula $M_xO_2$, where M is a single charged cation and x is 2, or M is a double charged cation and x is 1, or (b) a peroxo acid of sulfur, phosphorous, carbon, boron, or a halogen or a salt thereof, or (c) hydrogen peroxide, and substances that contain hydrogen peroxide.

Preferably, the aqueous solution also contains acid, and/or at least one catalyst or accelerator compound.

DESCRIPTION OF THE PREFERRED EMBODIMENTS

Figure 1:
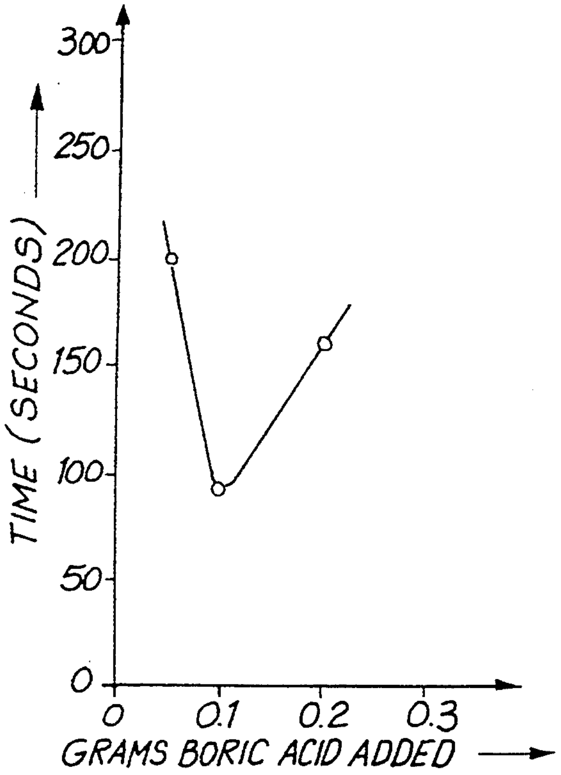
FIGS. 1 and 2 are graphs of the cleaning ability of various formulations.

The peroxo-type compounds according to the invention contain the -O-O- group, and comprise ionic or organic peroxides and hydroperoxides, and various peroxo anions containing the -O-O- group. These are discussed generally in F.A. Cotton and G Wilkinson, "*Advanced Inorganic Chemistry, A Comprehensive Text*", 3rd Ed., 1972, in Chapters 14-7 and 14-8, for example. Compounds that contain hydrogen peroxide or other peroxide are also included within the peroxo compounds of the invention.

Preferably the peroxide-type compound is selected from (a) ionic peroxides, and (b) peroxo acids. Mixtures of the different peroxo compounds may also be used.

It is preferred that the ionic peroxide is an alkali metal, alkaline earth metal, or ammonium, peroxide, or the peroxo acid is chosen from peroxodisulfuric acid or its salts, peroxomonosulfuric acid or a salt thereof, peroxodicarbonic acid or a salt thereof, peroxodiphosphonic acid or a salt thereof, per-organic acids or their salts, for example. Most preferred the peroxo compound is sodium persulfate (sodium peroxydisulfate $Na_2S_2O_8$).

Examples of suitable ionic peroxides include, sodium peroxide, ($Na_2O_2$), or its hydrate ($Na_2O_2.8H_2O$), or urea hydrogen peroxide. Examples of peroxo acids and their salts include potassium persulfate, sodium persulfate, ammonium persulfate, peracetic acid, perbenzoic acid, sodium perborate, sodium carbonate peroxyhydrate, sodium percarbonate, potassium percarbonate, and potassium carbonate peroxyhydrate, for instance.

Generally the peroxo-type compounds which can be used in the present invention are of three types. There are the inorganic peroxo compounds which can yield ionic peroxides ($O_2^{2-}$) upon hydrolysis. There are also the compounds that contain hydrogen peroxide of crystallisation such as sodium carbonate peroxyhydrate ($Na_2CO_3.3H_2O_2$). Finally there are organic peroxides or hydroperoxides such as peracetic acid, as one example. Some peroxide type compounds can be explosive or dangerous, and it is preferred that safe compounds are used in this invention. Persulfate compounds, such as sodium persulfate for example, are the preferred compounds in the invention, and these can be used safely, without difficulty.

Preferably also, the aqueous solution contains an acid if necessary, so that the pH is less than about 5.5. More preferably the pH is less than about 1.9. It is also preferred that the pH is more than about 0.8 or more than about 1.0. However, a pH lower than 0.8 may be useful in some circumstances, to clean photographic equipment requiring strong acid concentrations (with concentrated sulfuric acid for instance) in order to remove unusual build up on the equipment. Therefore strongly acid formulations are also part of the invention, which have a pH when made up very close to 0.

The acid (if used) may be selected from: citric acid, tartaric acid, ascorbic acid, sulfamic acid, hydrochloric acid, sulfuric acid, nitric acid, acetic acid, acetic anhydride, peracetic acid, or similar acids. If necessary, the solution can be buffered, by including a salt of the acid as well.

It is also preferred that the cleaning solution includes one or more catalysts or accelerators chosen from inorganic compounds whose oxidation states are between +5 to +7. These oxidising catalysts may be true catalysts, whereby they are not consumed in the cleaning process, or else may take part in the reaction and be consumed, and function as accelerators of the cleaning reactions. The exact action of these catalysts/accelerators is currently not well understood. For instance, when boric acid is used, tests show it is not consumed during the cleaning process, and so functions as a catalyst. The catalysts are present in relatively small amounts, generally less than 10% by weight of the active ingredients present.

These catalyst/accelerator compounds may be selected from:

(d) per-acids of Group 7, and their salts, or (e) other high oxidation state, oxygen-containing compounds, such as permanganate, dichromate, borate, ferricyanide, metavanadate, or other such compounds.

Examples of the per-acids and their salts include periodic acid, potassium periodate, sodium perchlorate, or ammonium perchlorate, for example. Other high oxidation state compounds that can be used in the invention include potassium permanganate, potassium dichromate, sodium permanganate, ammonium ferricyanide, potassium ferricyanide, sodium ferricyanide, ammonium metavanadate or sodium metavanadate and similar compounds, for instance.

Preferably the catalysts/accelerators are selected from compounds which contain the metavanadate, permanganate, borate, tetraborate, ferricyanide, metaperiodate, periodate, or dichromate moieties. The other portion of the compound may be a moiety chosen from hydrogen, ammonium, an alkali metal, or an alkaline earth metal, cation for example.

Suitable such catalyst-type compounds may be ammonium metavanadate, potassium permanganate, potassium ferricyanide, boric acid, potassium metaperiodate, sodium periodate, sodium tetraborate, or potassium dichromate, or mixtures thereof. The catalyst may take the place of, or contribute to the adjustment of the pH, particularly if boric acid is used, for example.

In a further embodiment of the present invention, the method of cleaning may use a dry formulation of the peroxotype compound, and optionally the acid, and optionally the catalyst, which are then mixed and dissolved in water in order to clean the photographic apparatus. The water may be at room temperature, or else warm or hot water may be used if desired.

In a further preferred embodiment of the invention, the cleaning method involves providing the peroxo compound in a separate container to the acid and/or catalyst (if present). For example, the peroxy compound may be packaged as a concentrated aqueous solution in a 500 ml bottle (optionally with a stabilizer), and the acid and catalyst in a second 500 ml bottle. Alternatively, the peroxy compound can be packaged as a dry powder in a 200 g sachet, with the acid and catalyst compounds mixed as a dry powder in a second, 95 g sachet. It is preferred that the cleaning method uses all three components, the peroxo compound, the acid, and a mixture of catalyst compounds. However, all the ingredients may be combined as a dry powder in a single container, or perhaps packaged separately, or in any other suitable combinations. Some or all of the ingredients may be dissolved in water or some other suitable solvent, also.

In accordance with another aspect of the present invention, the invention comprises a dry formulation for use in cleaning photographic apparatus, the dry formulation comprising a peroxo compound chosen from:

(a) an ionic peroxide of the formula $M_xO_2$, where M is a single charged cation and x is 2, or M is a double charged cation and x is 1, or (b) a peroxo acid of sulfur, phosphorous, carbon or boron, or a salt thereof, or (c) hydrogen peroxide, or substances that contain hydrogen peroxide.

Preferably the peroxo compound is an alkali metal, alkaline earth metal or ammonium peroxide, or a peroxo acid such as peroxo disulfuric acid, peroxo phosphonic acid, or the salts thereof, or any of the other compounds mentioned previously.

It is preferred for the formulation, which is eventually to be mixed with water to clean the photographic equipment, to contain an acid in order to adjust the pH of the cleaning solution, when made up, to less than 5.5 or more preferably to less than 1.9. If desired, the pH in this case can be at least 0.8, or at least 1. However, strongly acid formulations, as discussed previously, with a pH below 0.8 are also possible. If used, the acid can be selected from: citric acid, tartaric acid, ascorbic acid, sulfamic acid, hydrochloric acid, nitric acid, sulfuric acid, acetic acid (or its derivatives) or similar acids, as discussed above.

Optionally the mixture may contain as catalyst/accelerator one or more of (d) per-acids of Group 7, and their salts, or (e) other high oxidation state, oxygen-containing compounds, such as permanganate, dichromate, ferricyanide or metavanadate compounds.

Ideally these catalysts are chosen from compounds whose oxidation states are between +5 and +7. Preferably the catalysts are selected from compounds which contains metavanadate, permanganate, borate, tetraborate, ferricyanide, metaperiodate, periodate, or dichromate moieties. Suitable such catalyst compounds are ammonium metavanadate, potassium permanganate, potassium ferricyanide, boric acid, potassium metaperiodate, sodium periodate, sodium tetraborate, or potassium dichromate, or other such compounds as discussed previously.

The dry formulation is made up with water in order to produce a solution for cleaning photographic apparatus, such as developer racks and developer tanks. Preferably the dry formulation comprises a peroxo compound, an acid and a mixture of catalysts. In a preferred embodiment of the present invention the peroxo compound is stored in a separate container to the acid and catalyst compounds, until the cleaning solution is made up.

Preferably the dry formulation contains about 30 to 100%, more preferably 50 to 100%, by weight of the peroxo compound. Most preferably the peroxo compound comprises between 45 and 75% by weight of the active ingredients. Preferably the catalyst/accelerator is present in an amount of 0 to 50%, more preferably 0 to 10 or 20%, and most preferably from 0.1 to 10% by weight. If two of the catalyst compounds are present, then ideally they may each be present in an amount of about 5% by weight. The amount of acid present is sufficient to adjust the pH of the solution when made up to the desired pH range, athough high acid formulations may also be desired in some circumstances.

It is preferred to make up the cleaning solution by mixing the peroxo component with water; cold water is satisfactory, or else warm water can be used. The catalyst and acid portion is then added, and the concentrated solution is then poured over the developer rack while the developer rack is still in the developer tank. If desired, the powder can be poured directly into the empty developer tank and dissolved by pouring the required amount of water onto it, until the tank is filled with the required amount of water. The roller rack can then be placed in this solution and soaked until judged to be clean. The developer rack is normally left to soak in the cleaning solution for a few minutes, usually less than 5 minutes.

The concentration of the cleaning formulation in water when made up will depend on the user, but will normally be sufficient to clean the photographic apparatus in a reasonable short period of time. A usual concentration will be about 12.5 to 15 g/l of dry active ingredients in water. This will result from the user adding between 250 to 300 g of the powder formulation to 20 litres of water.

If necessary, or if desired, the cleaning formulations can contain other ingredients, such as stabilisers, drying agents (particularly for dry powders), colourants, surfactants, and so on, which generally do not adversely affect the cleaning ability of the formulations of the present invention.

The present invention therefore in one aspect concerns cleaning solutions which are environmentally friendly for photographic equipment, particularly photographic apparatus containing developer residues. The ingredients used are generally friendly to the environment, or are present in small amounts. The amount of the compounds used is smaller than that previously used with the potassium dichromate products, which produces a lower discharge of spent material to the environment. Another advantage of the present invention is that silver residue present is precipitated out as a collectable solid, which improves the ease of collecting and reprocessing the silver in the photographic waste.

Figure 2:
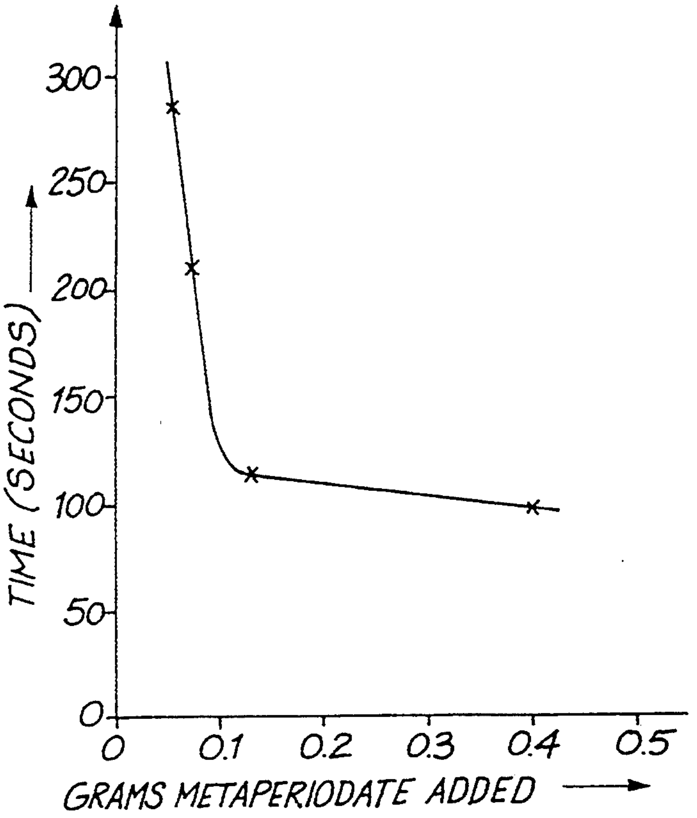

The invention is also described with reference to drawings, where FIG. 1 and FIG. 2 are graphs of the cleaning ability of various formulations, described in the following examples.

The invention is now described with reference to various examples.

Experimental method

Developed X-ray film is used as a test material to check the effectiveness of various cleaners. In the industry, developed X-ray film is used by the operators who clean photographic equipment to check the effectiveness of the prior art dichromate bas ed cleaner, when it is prepared for use. The prepared cleaning solution, if working properly, will very quickly strip the emulsion and other chemicals off the plastic film base. This indicates that the prepared solution will work well on the developer rack to be cleaned.

Therefore the experimental method for testing cleaning formulations was developed using this procedure. Firstly, strips of developed X-ray film were cut out of an approximate size of 70 ×25 min. 100 ml of the test solution was prepared dissolved in tap water at a temperature of about 35° C. The test solution was placed in a 100 ml beaker, and the test strip was then placed into the cleaning solution, while at the same time starting a timer. The test strip was observed, and the time taken for the emulsion to be stripped from the film was recorded.

Once a cleaning formulation was found to be effective using this test method, a further test was conducted using an actual photographic developer rack, to prove that the formulation would be effective in actual use.

EXAMPLE 1

A cleaning solution comprising sodium persulfate (and 50% w/w) and sulfamic acid (49.73%) was tested, at a concentration of 2% w/v in 100 ml of water, and this gave fair results after 10 minutes.

EXAMPLE 2

In a similar manner to the previous Examples, a cleaning solution was prepared comprising sodium persulfate 49.75%, sulfamic acid 49.75% and potassium permanganate 0.5%. Good results were achieved after 10 minutes, at a concentration of 2% w/v in 100 ml of water.

EXAMPLE 3

As in Example 1, a cleaning solution was prepared comprising sodium persulfate (49.75% w/w) and sulfamic acid (49.73%) and potassium dichromate (0.26%). The results also at 2% w/v were good after 10 minutes in cleaning the film test strip.

EXAMPLE 4

In a similar manner to the preceeding Examples, a cleaning solution was made up comprising sodium persulfate (59.9%), sulfamic acid (39.9%) and ammonium metavanadate (0.18%). The solution cleaned the film test strip in a concentration of 2% w/v in 6 minutes with good results.

EXAMPLE 5

In a similar manner to the preceeding Examples a cleaning solution was made up comprising sodium persulfate (58.8%), sulfamic acid (39.24%) and potassium ferricyanide (1.96%). The solution cleaned the film test strip in a concentration of 2% w/v in 6 minutes with good results.

EXAMPLE 6

As described in the preceeding Examples a cleaning solution was made up comprising sodium persulfate (47.62%), sulfamic acid (47.62%) and boric acid (4.76%). The solution cleaned the film test strip in a concentration of 2% w/v in 10 minutes with good results.

EXAMPLE 7

In a similar manner to the preceeding Examples a cleaning solution was made up comprising sodium persulfate (71.43%), sulfamic acid (23.81%) and sodium metaperiodate (4.76%). The solution cleaned the film test strip in a concentration of 2% w/v in 4 minutes with very good results.

EXAMPLE 8

In a similar manner to the preceeding Examples a cleaning solution was made up comprising sodium persulfate (40%), sulfamic acid (40%) and boric acid (20%). The solution cleaned the film test strip to about 50% clear in a concentration of 2% w/v in 10 minutes.

EXAMPLE 9

In a similar manner to the preceeding Examples a cleaning solution was made up comprising sodium persulfate (75%) and sulfamic acid (25%). The solution cleaned the film test strip in a concentration of 2% w/v in 10 minutes with fair results.

EXAMPLE 10

As in the the preceeding Examples, a cleaning solution was made up comprising sodium persulfate (73.2%), sulfamic acid (24.4%) and potassium dichromate (2.4%). The solution cleaned the film test strip in a concentration of 2% w/v in 10 minutes with good results.

EXAMPLE 11

In a similar manner to the preceeding Examples a cleaning solution was made up comprising sodium persulfate (71.10%), sulfamic acid (23.69%), potassium dichromate (0.47%) and boric acid (4.74%). The solution cleaned the film test strip in a concentration of 2% w/v in 10 minutes with good results.

EXAMPLE 12

In a similar manner to the preceeding Examples a cleaning solution was made up comprising sodium persulfate (50%), and tartaric acid (50%). The solution cleaned the film test strip in a concentration of 2% w/v in 10 minutes with fair results.

EXAMPLE 13

Tests were conducted in a similar manner to the previous Examples with a cleaning solution comprising sodium persulfate, sulfamic acid, boric acid, and sodium periodate each in varying amounts. The amounts and results are shown in the following table:

| | Amounts in *% w/w | | | | Results - Time to |
|---|---|---|---|---|---|
| | (1) | (2) | (3) | (4) | clean test Strip |
| (a) | 60.0 | 20.0 | 4.0 | 16.0 | 1 min 40 sec |
| (b) | 67.3 | 22.42 | 4.48 | 5.8 | 1 min 55 sec |
| (c) | 69.18 | 23.0 | 4.6 | 3.22 | 3 min 30 sec |
| (d) | 69.78 | 23.25 | 4.65 | 2.32 | 4 min 45 sec |
| (e) | 65.21 | 21.74 | 8.7 | 4.35 | 2 min 40 sec |
| (f) | 69.78 | 23.25 | 2.32 | 4.65 | 3 min 10 sec |
| (g) | 68.2 | 22.72 | 4.54 | 4.54 | 1 min 30 sec |

(1) sodium persulfate
(2) sulfamic acid
(3) boric acid
(4) sodium metaperiodate
*(Composition made up to a concentration of 2% w/v in 100 ml of water at 35° C.)

The results are also shown in Graphs 1 and 2 of the drawings. Graph 1 shows the results of changing the boric acid concentration when the metaperiodate is constant at about 0.1 g per 100 ml, and this indicates that the fastest film stripping speed occurs when boric acid is present at about a concentration of 0.1 g per 100 ml. Graph 2 shows the effect of changing the metaperiodate concentration while keeping the boric acid concentration constant at about 0.1 g per 100 ml. The best test film stripping speed occurs at about 0.1 g per 100 ml of metaperiodate.

Tests (d) and (f) show that by halving the relative amounts of either boric acid or metaperiodate will slow the performance of the formulation as a whole, and that it is best to use these two additives at a 1:1 ratio. A comparison with Examples 7 and 8 above shows that the blend of all four ingredients works more effectively than when using either of the boric acid or sodium metaperiodate additive on their own.

EXAMPLE 14

A formulation was made up containing 71.25% w/w of sodium persulfate, 23.75% sulfamic acid, 0.24% potassium dichromate, and 4.75% of sodium metaperiodate. In accordance with the test method of the preceding Examples the test film strip was cleaned in a time of 3 minutes.

EXAMPLE 15

A cleaning solution was made up comprising 50% (w/w) of sulfamic acid, and 50% of carbonate peroxihydrate. In a similar manner to the preceding Example the test film strip was cleaned in 45 minutes.

EXAMPLE 16

A cleaning solution was made up according to Example 13(g), comprising:

| component | formula | amount | wt % |
|---|---|---|---|
| sodium persulfate | $Na_2S_2O_8$ | 200 g | 68.2% |
| sulfamic acid | $NH_2SO_3H$ | 67 g | 22.72% |
| boric acid | $H_3BO_3$ | 14 g | 4.54% |
| sodium metaperiodate | $NAIO_4$ | 14 g | 4.54% |

The sodium persulfate was packaged in one bottle. The other three ingredients (constituting 95 g) were packaged together in another bottle. The powder mixture was poured into an empty 20 litre developer tank, and dissolved by adding cold water at about 15 C. The pH of the resultant solution is found to be about 1.0 to 1.1. The developer rack was placed into the tank, and the rack became clean in a few minutes.

EXAMPLE 17 (Comparison Example)

The same test procedure was used with the commercially available prior art dichromate formulation. This cleaned the test film strip in 4 minutes.

The invention has been described with reference to specific examples, but it is not to be considered as being limited in any way to those examples. Obvious and non-inventive variations and experimentation can be made without departing from the general scope and intent of this invention.

I claim:

1. A method of cleaning photographic apparatus contacting the apparatus with an aqueous composition containing by weight of the active ingredients, 50 to 98.9% of a persulfate salt, 1 to 40% of sulfamic acid and 0.1 to 10% at least one catalyst or accelerator compound chosen from ammonium metavanadate, potassium permanganate, potassium ferricyanide, boric acid, potassium metaperiodate, sodium periodate, sodium tetraborate, potassium dichromate or mixtures thereof; and precipitating silver deposits on said photographic apparatus with said aqueous composition.

2. A method of cleaning photographic apparatus according to claim 1 wherein boric acid and metaperiodate salt are the catalyst/accelerators.

3. A method of cleaning photographic apparatus comprising contacting the apparatus with an aqueous composition containing by weight of the active ingredients, 50 to 98.9% of a persulfate salt, 1 to 40% of sulfamic acid, 0.1 to 10% of boric acid and a metaperiodate salt.

4. A formulation for cleaning hotographic apparatus comprising by weight of the active ingredients:

50 to 98.9% of a persulfate salt;

1 to 40% of a sulfamic acid; and 0.1 to 10% of at least one catalyst or accelerator compound chosen from potassium permanganate, potassium ferricyanide, boric acid, potassium metaperiodate, sodium periodate, sodium tetraborate, potassium dichromate or mixtures thereof, said formulation causing silver deposits on said photographic apparatus to be precipitated.

5. A formulation for cleaning photographic apparatus according to claim 4 wherein boric acid and a metaperiodate salt are the catalyst/accelerators.

6. A formulation for cleaning photographic apparatus comprising by weight of the active ingredients:

50 to 98.9% of a persulfate salt;

1 to 40% of sulfamic acid;

0.1 to 10% of boric acid and a metaperiodate salt.

7. The formulation for cleaning photographic apparatus according to claim 6, which is a dry packaged formulation.

* * * * *